Jan. 25, 1938.　　　　　N. IACINO　　　　　2,106,568
WATER SHOWER TEMPERATURE REGULATOR
Filed April 17, 1936　　　2 Sheets-Sheet 1

INVENTOR
Nunzio Iacino
BY
ATTORNEY

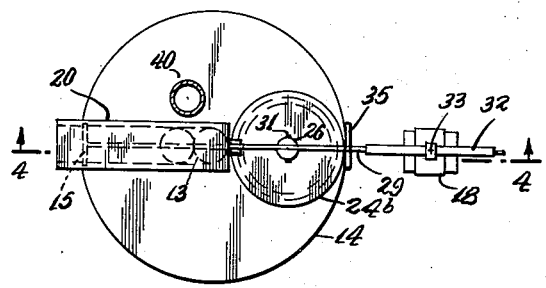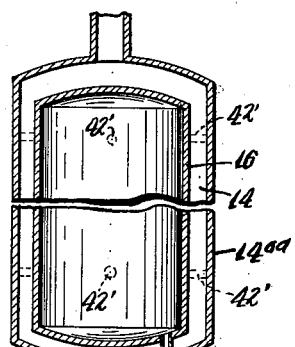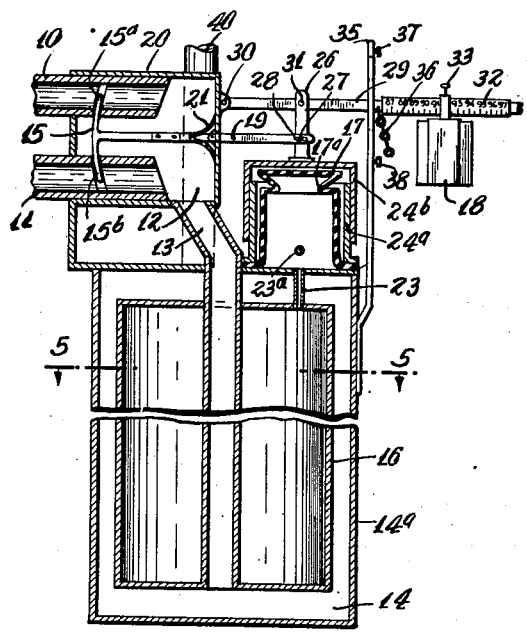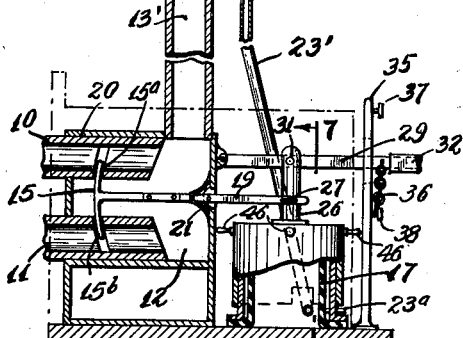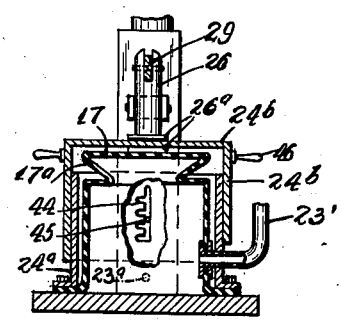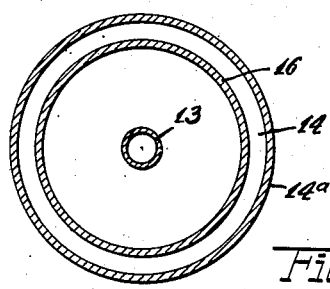

Patented Jan. 25, 1938

2,106,568

UNITED STATES PATENT OFFICE 2,106,568

WATER SHOWER TEMPERATURE REGULATOR

Nunzio Iacino, New York, N. Y.

Application April 17, 1936, Serial No. 74,973

5 Claims. (Cl. 236—12)

This invention relates to new and useful improvements in an automatic shower temperature regulator.

The invention has for an object the construction of a device as mentioned which is characterized by a compressed air or gas container within a chamber through which hot and cold water may circulate, and a valve controlled arrangement for controlling the relative supply of the hot and cold water, operated by the expansion and contraction of said air or gas.

A further object of the invention consists in so arranging the controlling mechanism that the compressed air or gas container may be in proximity therewith or at a remote point.

Still further the invention also proposes the provision of a diaphragm control for said air or gas and connected with a means for translating the movement of the diaphragm to move the valve.

Still further the invention contemplates the provision of a counterweighting means for counterweighting the action of the diaphragm as desired.

Another object is the construction of an article as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 3 is an enlarged plan view of the regulating mechanism shown in Fig. 1.

Fig. 4 is a vertical sectional view taken on the line 4—4 of Fig. 3.

Fig. 5 is a horizontal sectional view taken on the line 5—5 of Fig. 4.

Fig. 6 is a vertical sectional view of the apparatus used in the device shown in Fig. 2.

Fig. 7 is a fragmentary enlarged sectional view taken on the line 7—7 of Fig. 6.

Figure 1:
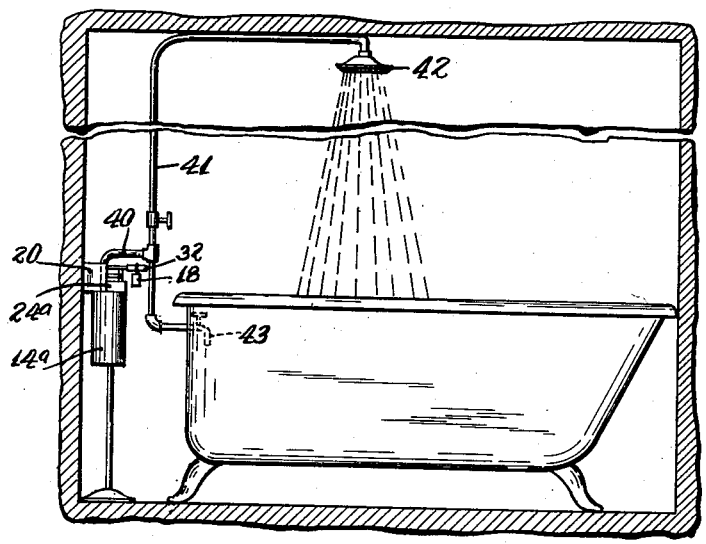
Figure 1 is a transverse sectional view of a bathroom and an automatic shower temperature regulator associated with the bath tub.

In Figs. 3-5 inclusive one form of automatic shower temperature regulator, according to this invention, is shown which includes a cold water supply 10, a hot water supply 11, and these supplies charging into a mixing passage 12. This mixing passage is connected by a pipe 13 with a circulating chamber 14 within a container 14ª.

Valves 15ª and 15ᵇ are arranged for controlling the supplies 10 and 11 and are connected with each other to operate oppositely simultaneously. A compressed air container 16 is arranged within the chamber 14. A diaphragm 17 is controlled by the air or gas within the container 16 and is associated with a means for translating its movements to move the said valves 15ª and 15ᵇ. A means is provided for counterweighting the action of the diaphragm 17 and includes an adjustable weight 18.

The cold and hot water supplies 10 and 11 are arranged substantially parallel to each other and slightly spaced apart, and the valves 15ª and 15ᵇ are disposed between these supplies. The valves comprise an arcuate member 15, the opposite ends of which constitute the valves 15ª and 15ᵇ. The arcuate member 15 is mounted upon the end of a valve stem 19 which projects through one side of a body 20 housing the inner ends of the supplies 10 and 11. At the point where the stem 19 passes through the side wall of the body 20 there is a rubber or other waterproof resilient member 21 which prevents leakage of water from the body, and at the same time pivotally supports the stem 19 so that it may move.

The compressed air container 16 is connected by a small pipe 23 with the underside of the diaphragm 17. The diaphragm 17 is of cylindrical shape and has folds 17ª at its sides so that it may readily expand. The diaphragm is housed within a telescopic casing consisting of a bottom stationary section 24ª and a top movable section 24ᵇ. The stationary section 24ª is attached upon the top of the container 14ª. The movable section 24ᵇ rests on the top of the diaphragm 17. It is provided with a projecting finger 26 which has a pin 27 engaging in an elongated slot 28 formed in the rod 19. It will thus be seen that movement of the diaphragm 17 is translated to pivot the stem 19.

The means for counterweighting the action of the diaphragm consists of an arm 29 which is pivotally supported at one end 30 upon the side of the body 20. Intermediately a pintle pin 31 pivotally connects the finger 26 with the arm 29. At the outer end the arm 29 is provided with a scale 32 upon which the weight 18 is adjustably mounted. This scale is calibrated in degrees of temperature to give the various positions of the weight 18 for obtaining the specific degrees of temperature. A set screw 33 serves to fixedly mount the weight 18 in desired position upon the scale.

A support bracket 35 is attached on the side of the container 14a and extends upwards and is formed with an elongated opening through which the arm 29 passes. A chain 36 is attached upon the arm 29 and may be hooked upon a fastening element 37 above the arm 29, or another fastening element below the arm 29. These fastening elements are so located that in one position the hot water supply will be completely closed, while in the other position the cold water supply will be completely closed.

A discharge pipe 40 extends from the top of the container 14a and connects with the pipe line 41 supplying the shower element 42 and a faucet 43 for the bath.

The pressure in diaphragm 17 may also be increased for regulating same through a suitable valve 23a.

Figure 2:
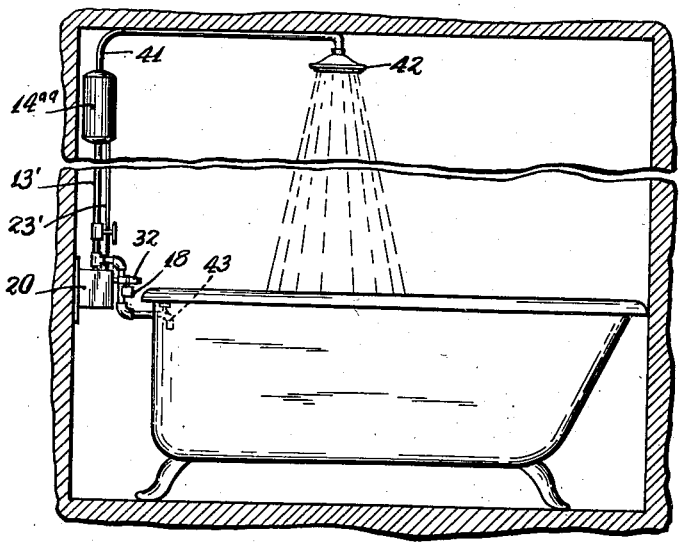
Fig. 2 is a view similar to Fig. 1 but illustrating a modified arrangement.

In Figs. 2, 6 and 7 a modified form of the invention has been disclosed which differentiates from the prior form in several respects. In the first place it is provided with a container 14aa which is remote from the other mechanism of the device. This container is situated high up on the pipe line 41, or any other remote discharge point. Within the container 14aa there is a chamber 14 in which the compressed air or gas container 16 is mounted. This container is supported spaced from the walls of the container 14aa by a plurality of holding elements 42′ between these parts. A small diameter or pipe 23′ connects the container 16 with the underside of the diaphragm 17. The mixing chamber 12 is connected with the container 14aa by a pipe line 13′.

Another distinction in this form of the invention resides in the provision of a mechanism for holding the valves in a multitude of fixed positions. This mechanism includes an arrangement whereby the movable telescopic casing 24b is rotatively connected with the finger 26. This is accomplished by collars 26a. Handles 46 radially project from the container section 24b by which it may be manually gripped and moved. A pin 45 projects from the section 24b and engages in bayonet slots 44 formed in the stationary section 24a. This bayonet slot has a vertical passage in which the pin 45 may move, which vertical passage connects with a plurality of short horizontal passages.

Normally, the pin 45 works in the vertical portion of the bayonet slot and then the operation of the device is identical to that previously described. In order to fixedly hold the valves controlling the hot and cold water supply in desired positions, it is merely necessary to manually force the container 24b upwards or downwards and turn it slightly to engage the pin 45 in one of the horizontal branches of the bayonet slot. Then irrespective of the increased or falling pressures within the air or gas container, the device will be maintained with the valves in a predetermined position.

The operation of the device is as follows: A change in the temperature of the water passing through the circulating chamber will affect the air or gas within the container. If the temperature of the circulating water increases the air or gas will be expanded which will cause the diaphragm 17 to move upwards. This upward motion is transmitted to the stem 19 which is pivoted so that the hot water is slightly restricted, while at the same time the cold water is slightly opened up. This change will serve to bring the circulating water back to the set temperature. This set temperature may be varied by adjusting the position of the counterweight 18.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention what I claim as new, and desire to secure by United States Letters Patent is:—

1. An automatic shower temperature regulator, comprising a hot and cold water supply discharging into a mixing passage and then into a circulating chamber, valves for controlling said supplies and connected together to operate oppositely simultaneously, a compressed air or gas container within said chamber, a diaphragm controlled by said air or gas, means for translating the movements of said diaphragm to move said valves, and means for counterweighting the action of said diaphragm, said diaphragm being housed within a telescopic casing having a bottom fixed section and a top movable section, a finger projecting from said top movable section, and a valve stem for operating said valves connected with said finger, a rod being pivotally mounted at one end to a fixed part, and intermediately pivotally mounted with said finger, and its free end provided with a movable seat, and a chain connected with said arm and adapted to engage elements on the stationary part by which the valves may be held in pre-determined fixed positions.

2. An automatic shower temperature regulator, comprising a hot and cold water supply discharging into a mixing passage and then into a circulating chamber, valves for controlling said supplies and connected together to operate oppositely simultaneously, a compressed air or gas container within said chamber, a diaphragm controlled by said air or gas, means for translating the movements of said diaphragm to move said valves, and means for counterweighting the action of said diaphragm, said diaphragm being housed within a telescopic casing and acting against a movable section of said casing, a finger rotatively mounted on said movable section, a valve stem connected with said finger and with the valves, and means for holding said casing sections in various relative positions to hold the valves correspondingly.

3. An automatic shower temperature regulator, comprising a hot and cold water supply discharging into a mixing passage and then into a circulating chamber, valves for controlling said supplies and connected together to operate oppositely simultaneously, a compressed air or gas container within said chamber, a diaphragm controlled by said air or gas, means for translating the movements of said diaphragm to move said valves, and means for counterweighting the action of said diaphragm, said diaphragm being housed within a telescopic casing and acting against a movable section of said casing, a finger rotatively mounted on said movable section, a valve stem connected with said finger and with the valves, and means for holding said casing sections in various relative positions to hold the valves correspondingly, comprising a pin on said movable section adapted to engage a bayonet slot in said stationary section.

4. An automatic shower temperature regulator, comprising a hot and cold water supply discharging into a mixing passage, and then into a circulating chamber, valves for controlling said supplies and connected together to operate oppositely simultaneously, a compressed air or gas container within said chamber, a diaphragm controlled by said air or gas, means for translating the movements of said diaphragm to move said valves, and means for counterweighting the action of said diaphragm, said diaphragm being housed within a telescopic casing and acting against a movable section of said casing, a finger rotatively mounted on said movable section, a valve stem connected with said finger and with the valves, and means for holding said casing sections in various relative positions to hold the valves correspondingly, comprising a pin on said movable section adapted to engage a bayonet slot in said stationary section, said movable section being swivelly connected with said finger to allow said section to be turned in order to engage and disengage said pin from said slots.

5. An automatic shower temperature regulator, comprising a hot and cold water supply discharging into a mixing passage and then into a circulating chamber, valves for controlling said supplies and connected together to operate oppositely simultaneously, a compressed air or gas container within said chamber, a diaphragm controlled by said air or gas, means for translating the movements of said diaphragm to move said valves, and means for counterweighting the action of said diaphragm, said diaphragm being housed within a telescopic casing having a bottom fixed section and a top movable section, a finger projecting from said top movable section, and a valve stem for operating said valves connected with said finger, a rod being pivotally mounted at one end to a fixed part, and intermediately pivotally mounted with said finger, and its free end provided with a movable seat, and a chain connected with said arm and adapted to engage elements on the stationary part by which the valves may be held in pre-determined fixed positions, said elements comprising stationary pins mounted on said stationary part above and below said arm onto which the links of said chain may be hooked to control the passage of the hot and cold water.

NUNZIO IACINO.